United States Patent
Schmidt

(10) Patent No.: US 11,396,866 B2
(45) Date of Patent: Jul. 26, 2022

(54) SUCTION PUMP AND NEGATIVE-PRESSURE RETAINING DEVICE HAVING A SUCTION PUMP, AND METHOD FOR ATTACHING A NEGATIVE-PRESSURE RETAINING DEVICE

(71) Applicant: Patrick Schmidt, Seevetal (DE)

(72) Inventor: Patrick Schmidt, Seevetal (DE)

(*) Notice: Subject to any disclaimer, the term of this patent is extended or adjusted under 35 U.S.C. 154(b) by 343 days.

(21) Appl. No.: 16/476,427

(22) PCT Filed: Jan. 11, 2018

(86) PCT No.: PCT/DE2018/100016
§ 371 (c)(1),
(2) Date: Jul. 8, 2019

(87) PCT Pub. No.: WO2018/130248
PCT Pub. Date: Jul. 19, 2018

(65) Prior Publication Data
US 2021/0324841 A1   Oct. 21, 2021

(30) Foreign Application Priority Data
Jan. 11, 2017   (DE) .......................... 202017100097.4

(51) Int. Cl.
*F04B 33/00* (2006.01)
*F16B 47/00* (2006.01)

(52) U.S. Cl.
CPC .............. *F04B 33/00* (2013.01); *F16B 47/00* (2013.01)

(58) Field of Classification Search
CPC ................................. F04B 33/00; F16B 47/00
USPC ......................................... 269/21; 248/205.1
See application file for complete search history.

(56) References Cited

U.S. PATENT DOCUMENTS

| | | | | |
|---|---|---|---|---|
| 1,253,976 A * | 1/1918 | Hughes | ............... | F04B 33/005 92/144 |
| 5,364,241 A * | 11/1994 | Schultz | ............... | F04B 33/00 53/88 |
| 5,385,524 A * | 1/1995 | Jahoda | ............... | A63B 21/4025 482/112 |
| 6,827,344 B1 * | 12/2004 | Ristau | ............... | F16B 47/00 269/21 |

(Continued)

FOREIGN PATENT DOCUMENTS

| CH | 108067 | 12/1924 |
|---|---|---|
| DE | 195 03 680 A1 | 11/1995 |

(Continued)

OTHER PUBLICATIONS

Notification of Transmittal of the International Search Report and the Written Opinion of the International Searching Authority, or the Declaration in German Language (Form PCT/ISA/220) dated Apr. 30, 2018.

(Continued)

*Primary Examiner* — Muhammad Ijaz
(74) *Attorney, Agent, or Firm* — Locke Lord LLP; Alan B. Clement; Nicholas J. DiCeglie, Jr.

(57) ABSTRACT

The subject of the invention is a suction pump having a suction tube and a suction piston for producing a negative pressure in a negative-pressure retaining device, a set consisting of the negative-pressure retaining device and the suction pump, and a method for attaching the negative-pressure retaining device.

7 Claims, 2 Drawing Sheets

(56) References Cited

U.S. PATENT DOCUMENTS

Figure 1:
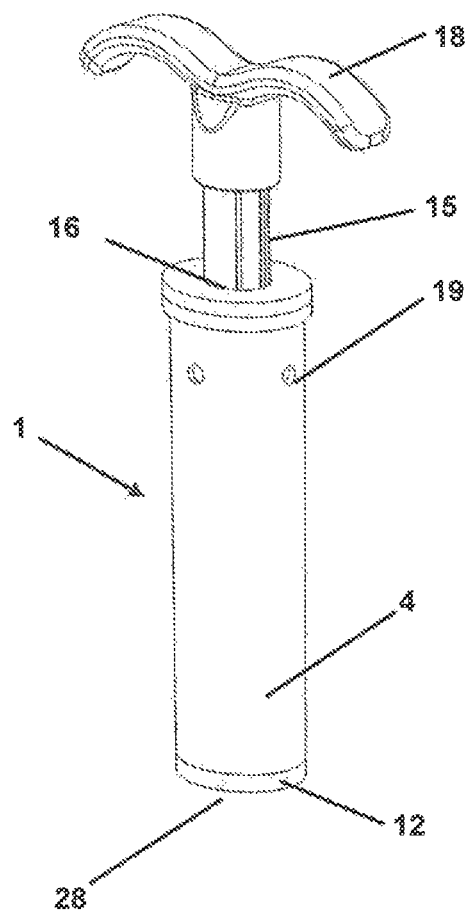

| | | | |
|---|---|---|---|
| 9,803,680 B2 | 10/2017 | Potters et al. | |
| 10,718,322 B1* | 7/2020 | Rogish | F04B 53/1037 |
| 2005/0103808 A1* | 5/2005 | Zschiedrich | F16B 47/00 |
| | | | 222/326 |
| 2007/0071624 A1* | 3/2007 | Brewer, Jr. | F04B 9/14 |
| | | | 417/460 |
| 2009/0175747 A1* | 7/2009 | LeBoeuf | F04B 33/00 |
| | | | 417/545 |
| 2009/0238702 A1 | 9/2009 | Blythe | |
| 2015/0377280 A1* | 12/2015 | Pötters | A47G 1/17 |
| | | | 248/205.9 |

FOREIGN PATENT DOCUMENTS

| | | |
|---|---|---|
| DE | 299 16 197 U1 | 3/2000 |
| DE | 10 2013 101 100 A1 | 8/2014 |
| RU | 2307671 C2 | 10/2007 |
| RU | 2013158733 A | 7/2015 |
| WO | WO 01/20177 A1 | 3/2001 |
| WO | WO 2005/059360 A1 | 6/2005 |
| WO | WO 2014/117766 A2 | 8/2014 |

OTHER PUBLICATIONS

Written Opinion of the International Searching Authority in German Language (Form PCT/ISA/237) dated Apr. 30, 2018.
Russian Office Action and Search Report dated Apr. 6, 2021 corresponding to International Application No. PCT/DE2018/100016, 7 pages.

\* cited by examiner

SUCTION PUMP AND NEGATIVE-PRESSURE RETAINING DEVICE HAVING A SUCTION PUMP, AND METHOD FOR ATTACHING A NEGATIVE-PRESSURE RETAINING DEVICE

This application is a national phase entry under 35 U.S.C. § 371 of International Application Number PCT/DE2018/100016, filed Jan. 11, 2018, which claims the benefit of German Patent Application No. DE 202017100097.4, filed Jan. 11, 2017, all of which are hereby incorporated by reference in their entireties.

INTRODUCTION

The invention relates to a suction pump having a suction tube and a suction piston for producing a negative pressure in a negative-pressure retaining device, to a set consisting of the negative-pressure retaining device and the suction pump, and to a method for attaching the negative-pressure retaining device.

PRIOR ART AND OBJECT

Negative-pressure retaining devices are for example known as suction cup mounts. Conventional suction cup mounts have a suction cup that is made from an elastic plastic material and is to ensure an airtight seal between the suction cup and the smooth gas-impermeable contact surface such as a bathroom tile. The negative pressure necessary for the adhesive effect in the negative pressure chamber is produced by pressing the plate-shaped suction cup onto a contact surface, wherein air escapes from the negative pressure chamber of the suction cup before the suction cup is fixed, and a negative pressure is produced by the restoring force of the elastic material.

A releasable retaining device that works with negative pressure is known from WO 01/20177 A1 and WO 2014/117766 A2. This retaining device possesses a retaining body that can be placed airtight on a gas-impermeable contact surface by means of a seal consisting of elastic material, and on which devices for various carrying functions can be mounted. The retaining body has a negative pressure chamber open toward the contact surface with an elastic seal toward the contact surface and a valve toward the negative pressure chamber by means of which a negative pressure can be produced by means of a suction device in the suction chamber when the retaining body is placed on the contact surface. The retaining device can be secured to tile walls by means of the carrying functions such as bathroom accessories like soap dishes or suspension hooks.

After the valve is opened, the retaining device can be removed. According to WO 01/20177 A1, a suction tube open at the top with a rubber seal can be placed on the top side of the hollow retaining body.

By pulling the suction piston out of the suction tube, the desired negative pressure is produced due to the associated suction effect in the negative pressure chamber that draws the retaining body of the negative-pressure retaining device against the contact surface. If the suction piston leaves the suction tube at the end open at the top, ambient air suddenly flows into the suction piston along with a "pop" and seals the valve by pressing it into its valve seat due to the external ambient pressure.

The design has the disadvantage that the suction piston inevitably leaves the suction tube at the end of a pulling-out process, and the suction tube must be removed from the valve seat for a repeat suction process, the suction piston must be reinserted into the suction tube and shoved downward. Only then can the suction tube be recoupled airtight to the valve seat and the suction process restarted. The suction pump disclosed in WO 2014/117766 A2 has a complicated design with regard to the suction pump valve.

The object of the invention is to simplify the process known from the prior art for untrained users and to restrict the number of separately available parts of such a set to two, i.e., the suction pump and negative-pressure retaining device, as well as provide a technically simple suction pump.

SUMMARY OF THE INVENTION

The object is achieved according to the invention with a suction pump consisting of a suction tube and suction piston according to claim 1, or respectively the set according to additional independent claims. Preferred embodiments are the subject matter of the dependent claims or are described below.

The suction pump according to the invention comprises a suction tube and a suction piston guided in the suction tube along a suction tube wall with a piston interior, wherein at one end, the suction piston has a piston head with a piston seal, the piston seal sealingly lies against the inside of the suction tube wall of the suction tube, and the piston head with the piston seal can be moved away from the suction tube opening in the suction tube along a suction path.

The suction tube at the end of the suction path has one or more vent openings in the suction tube wall, and the piston seal can be moved past the vent openings so that ambient air can suddenly flow into the piston interior of the suction tube.

The suction pump consisting of the suction tube and suction piston has at least one opening in the suction tube wall of the suction tube toward the end of the pull-out path which the piston head of the suction piston with the piston seal passes, and thereby spontaneously ends the suction process due to entering ambient air. When the piston seal has passed the at least one opening, outside air spontaneously enters into the suction tube through the at least one opening and eliminates the negative pressure in the suction tube. The suction process is thus suddenly ended, and the valve of the negative-pressure retaining device on which the suction pump is placed and was initially lifted by the negative pressure out of its valve seat is pressed against its valve seat and blocks the ambient air against the negative pressure in the negative pressure chamber.

The suction pump preferably consists of plastic such as an impact-resistant plastic like ABS.

DETAILED DESCRIPTION OF THE INVENTION

The negative-pressure retaining device for attaching objects to a substantially gas-tight contact surface has:
  a retaining body which forms a negative pressure chamber, wherein a negative pressure can be produced in the negative pressure chamber after being applied to the contact surface,
  at least one seal which seals the negative pressure chamber gas-tight to the outside against the contact surface and for example is peripherally recessed in the retaining body,
  at least one opening as an end of a connection of the negative pressure chamber to the outside environment with at least one valve that ensures gas-tight closing and opening of the connection of the negative pressure chamber to the external environment, means for establishing a releasable substantially gas-tight coupling of the suction tube opening to the suction pump for producing a negative pressure, and a carrier for a hook or an adapter for fastening objects to the negative-pressure retaining device.

The fastening of the negative-pressure retaining device by means of the suction pump to a contact surface comprises the following steps:

place the negative-pressure retaining device on the contact surface, establish a releasable substantially gas-tight coupling of the outwardly-directed opening of the negative-pressure retaining device having the valve to the suction pump, produce a negative pressure in the negative-pressure chamber with the suction pump by one, preferably two or three suction pulls.

All substantially air-impermeable substrates such as ceramic, stoneware, plastic-coated woods, glass or metal surfaces are suitable for attaching the retaining body to the negative pressure retaining device. In particular, no drilling that damages the retaining surfaces or other introduction of screws or nails is necessary for permanent retention, even with a rough structure. The negative-pressure retaining device according to the invention enables reversible and nondestructive fastening.

The negative-pressure retaining device can for example be used in the household, in trailers, sailboats, motor yachts, on wood paneling, in fair construction or in the medical field such as in operating rooms, in particular wherever screwing or adhesion is impossible or impermissible.

The retaining device serves to attach utensils such as soap dishes or suspension hooks, preferably on walls of wet rooms such as bathrooms, toilets or kitchens, or on glass or plastic panes. Use is however not restricted thereto. The requirement is that air-impermeable substrates such as ceramic, glass, plastic or metal surfaces are available for affixing.

The negative-pressure retaining device preferably consists of plastic, such as an impact-resistant plastic like ABS (acrylonitrile butadiene styrene) or polyamide and is moreover preferably designed round, or respectively oval, or square as well, toward the contact surface. The air-tight seal between the negative-pressure chamber and the contact surface is for example effectuated by a flat seal which is inserted in a receiving surface in the edge of the negative pressure chamber.

The retaining device seal which seals the negative pressure chamber to the outside gas-tight against the contact surface is preferably a flat seal consisting of elastic material such as rubber that may be provided on one and/or both sides with compensating ribs. An example of such a flat seal is known from WO 2014/117766 A2. Such a seal with one or more U-profiles and with a corresponding configuration of the bars on the retaining device can also be used in the present case.

The retaining device seal is preferably made of a relatively soft, elastic, in particular rubber elastic material (such as a thermoplastic elastomer) and in particular has a hardness of 15 to 30 Shore A, especially preferably 15 to 20 Shore A. Suitable materials for the seal and the valve are synthetic rubbers and thermoplastic elastomers. The seal is designed peripheral and is preferably designed as a sealing ring.

The connection of the negative pressure chamber to the external environment is preferably designed in the form of a dome that has a conical recess in the top end in the form of a conical, spherical, or hemispherical contact surface that opens to the outside for receiving a valve. The top edge of the dome with the valve seat can be sealed by a cap that is removable. If desired, the cap can also press the elastic valve into the valve seat. The cap then causes the elastic valve to be additionally sealingly pressed into the contact surface of the dome by the inner surface of the cap cover.

According to one preferred embodiment, the valve is also designed conical, spherical or hemispherical in order to ensure secure placement corresponding to the contact surface of the dome.

The valve tapers toward the negative-pressure chamber. It functions as a suction/sealing valve. Preferably, the valve is held in the contact surface with the assistance of elastic means such as an elastic strip or rod or a spring that can be an integral part of the valve, possibly under pretension. In this case, the dome is preferably designed such that it provides support for the end of the elastic means. For example, the valve can be designed so that it first tapers downward spherically, hemispherically, or conically and then ends further downward as a strip or rod. At the end of the strip or rod, there is a resistance which can be designed in the form of one or more, preferably two, protruding pins or a wedge. At least in the regions that are in contact with the contact surface, the valve consists of a rubber elastic material so that the valve is preferably reversibly deformable, at least in the top spherical, hemispherical or conical region, for example under the effect of forces as exerted by fingers. The negative-pressure retaining device can be easily removed from the contact surface by opening the valve. The valve is opened by being deformed, or respectively moved under lateral pressure, for example by a finger, wherein a connection is established between the negative pressure chamber and the external environment, and pressure equalization is established between the environmental pressure and negative pressure chamber. The valve can be made of the same material as the retaining device seal. The valve has a hardness of 15 to 30 Shore A; 15 to 20 Shore A is particularly preferable.

By removing the piston rod out of the suction tube, the valve is lifted slightly by the produced negative pressure out of the pretension, and the still available atmosphere is largely removed from the negative pressure chamber. At the moment in which the suction piston passes the top openings in the wall of the suction tube, the valve is pressed against its contact surface by the pretension and the built-up pressure differential and seals the negative pressure chamber airtight against external pressure. When the opening is passed, it is important for a large amount of ambient air to enter the suction piston all at once so that the valve of the negative-pressure retaining device closes as quickly as possible by the sudden change in pressure.

According to another embodiment, the valve is designed in the form of a lip-shaped gap, wherein the lips run together conically in a slit and press together in the event of negative pressure.

The suction tube can be coupled basically gas-tight to the negative-pressure retaining device by being placed on the coupling surface that releasably surrounds the valve seat. The suction tube has a round or oval cross-section.

At the top end (end of the suction path), the suction tube has a stop that prevents the piston head of the suction piston from being completely removed out of the suction tube. Several suction processes can accordingly follow each other more quickly. According to one embodiment, the suction tube wall of the suction pump has 2 to 4 vent openings at the end of the suction path.

At the bottom end (start of the suction path), the suction tube has a suction tube seal which supports the gas-tight coupling to the negative pressure retaining device, and preferably tightly encloses the valve. The bottom suction tube opening in the suction tube is closed by a mounted suction tube seal, for example in the form of a round elastic band with a U-profile.

The suction piston has a pull rod with a grip at one end and a piston head at its other end.

According to a preferred embodiment of the invention, the piston head of the suction piston is provided with a first suction sealing washer mounted radially around the shaft, and at a distance therefrom with a second suction sealing washer, wherein at least one recess is provided in the second suction sealing washer from the outer edge of the suction sealing washer toward the center of the suction sealing washer, preferably two or three recesses.

A sealing ring is arranged between the two suction sealing washers, preferably with slight play, such as a play of 5 to 100%, preferably 10 to 20% of the thickness of the sealing ring. Expressed otherwise, the distance between the suction sealing washers is preferably 0 to 100%, in particular 5 to 50%, and particularly preferably 10 to 20% more than the thickness of the sealing ring (in a relaxed state in each case). If for example the sealing ring has a thickness of 2.65 mm, the inner spacing of the suction sealing washers is 3 mm.

Preferably, the outer diameter of the sealing ring is just as large as the inner diameter of the suction piston, preferably slightly larger, such as 1 to 10%, in particular 1 to 3% larger. If for example the sealing ring has an outer diameter of 24.3 mm, the suction tube has an inner diameter of 24 mm.

The sealing ring is inserted between the two suction sealing washers. Upon a movement of the suction piston in the suction direction, the sealing ring lies on the first suction sealing washer in order to seal the annular gap between the first suction sealing washer and the suction piston upon the suction movement. If the to first annular gap is covered by the sealing ring, i.e., sealed, then a negative pressure rises on the side toward the negative pressure chamber upon pulling out the suction piston in the suction tube.

The first suction sealing washer preferably has a rounded inner edge so that the sealing ring can lie in the first annular gap with a better seal.

The recess(es) in the second suction sealing washer causes a pressure equalization on both sides of the suction sealing washer when the suction piston is driven into the suction tube and the sealing ring presses against the second suction sealing washer. The thereby compressed air moves past the sealing ring in the region of the recess. This prevents a compression of the air in the foot of the suction tube.

If there is any play in the sealing ring, the sealing ring travels downward and rests against the first suction sealing washer when negative pressure builds up in the suction tube, and the suction piston is drawn toward the suction tube end.

In the event of a shock movement of the piston head towards the floor of the suction tube, the sealing ring travels upward given any play in the suction sealing washers and rests against the annular gap in the second suction sealing washer, wherein the recesses remain free, or respectively the seal can release passages therein, and a pressure equalization between the two sides of the suction sealing washer can thus occur.

According to this embodiment, the seal of the piston head is designed as a washer or as an O-ring, preferably as an O-ring. The seal of the piston head in particular has a hardness greater than 50 Shore A.

According to a second embodiment of the invention, openings are provided in the suction tube that are sealed to the outside with an elastic rubber sleeve instead of openings in the second suction sealing washer close to the coupling end of the suction tube. The interior of the suction piston is vented in that the vent openings are sealed on the outside with an elastic rubber sleeve, and the overpressure is released through the vent openings in that they release air passages to the outside by the overpressure. When the suction piston travels downward, air passes by the sleeve to the outside. They close upon a negative pressure in the suction tube. According to this embodiment, the piston head can have a conventional rubber lip seal toward the suction tube, or respectively two suction sealing washers (without a recess) designed as solid bodies between which the sealing ring is secured, or an O-ring is drawn into a groove in the piston head.

Figure 2:
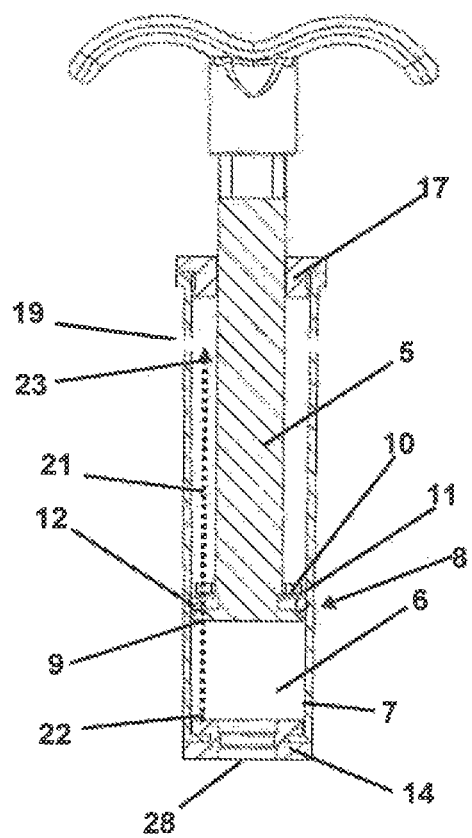
Figure 3:
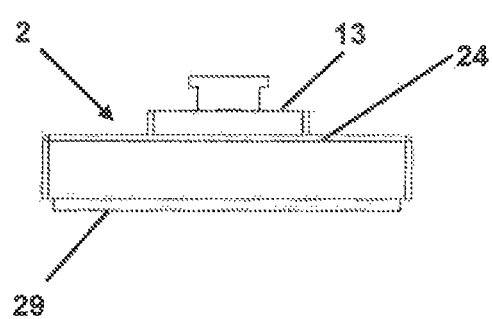
Figure 4:
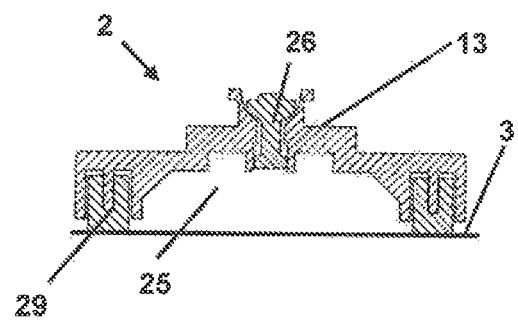
Figure 5:
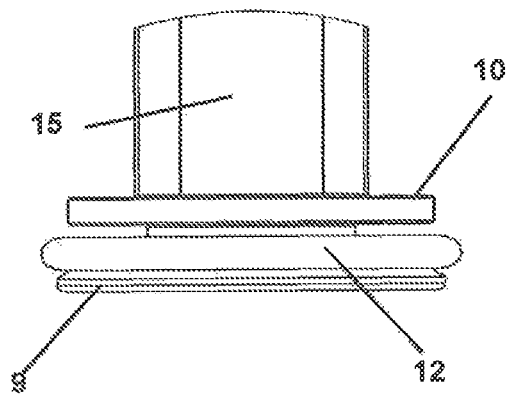
Figure 6:
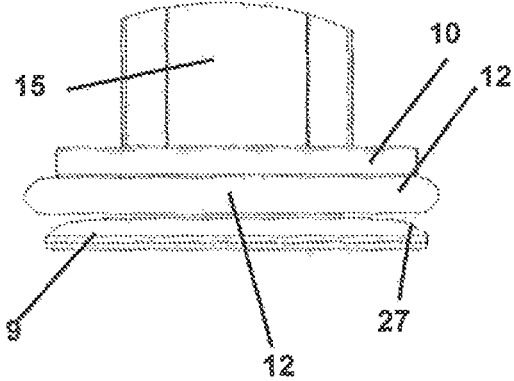
Figure 7:
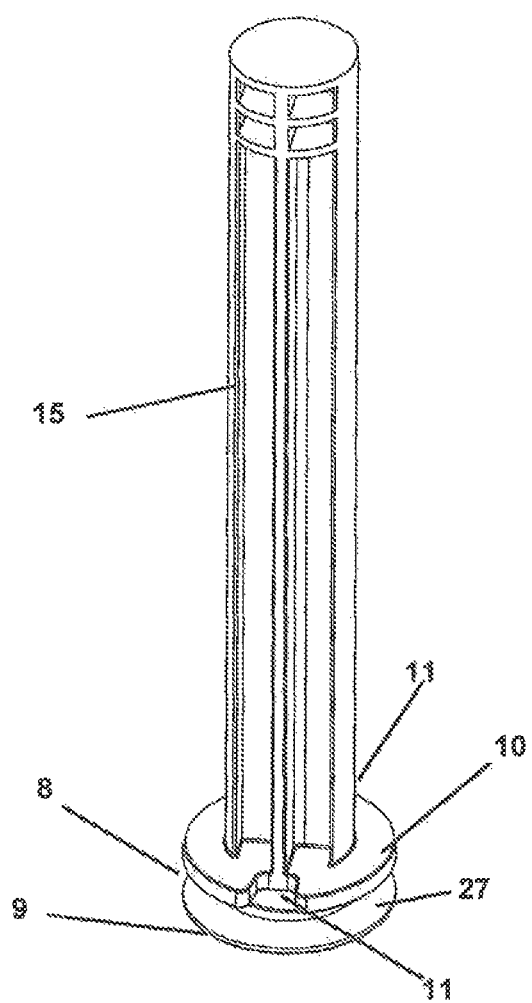

In the following, an example of the subject matter of the invention is explained with reference to FIGS. 1 to 7. In the following:

FIG. 1 shows a suction pump according to the invention in a schematic representation, FIG. 2 shows a section of the suction pump according to FIG. 1, FIG. 3 shows a section of the negative-pressure retaining device in a schematic representation, FIG. 4 shows a section of the negative-pressure retaining device according to FIG. 3, FIG. 5 shows the piston head with a sealing ring underneath (lying against the first (closed suction sealing washer) during the suction process in a schematic representation, FIG. 6 shows the piston head with a sealing ring lying above (lying against the second suction sealing washer with two recesses) while the suction piston is being pressed down in a schematic representation, FIG. 7 shows the suction piston of the suction pump (without a seal) in a schematic view with the recesses in the second suction sealing washer.

The suction pump 1 shown in FIG. 1 and in FIG. 2 in a section releasably couples with a negative-pressure retaining device 2 as shown in an example in FIG. 3 in order to secure it against a contact surface 3. The suction pump 1 has a suction tube 4 and a suction piston 5 that can move in the suction tube 4. At one end of the suction piston 5, a piston head 8 is provided with at least two suction sealing washers 9 and 10. Two recesses 11 are provided (see FIG. 7) in the second suction sealing washer 10 introduced in the direction of the center of the suction sealing washer 10. An O-ring 12 with slight play is arranged between the first suction sealing washer 9 and second suction sealing washer 10. Between the two suction sealing washers 9 and 10, this O-ring 12 is permanently held on the suction piston 5 due to its outer diameter that more or less corresponds to the inner suction piston diameter. The two suction sealing washers 9 and 10 may also have the inner suction piston diameter so that only a thin gap is formed.

The suction tube 4 is placed airtight on the coupling surface 13 for the suction processes. The airtight seating is supported by the suction tube seal 14 on the end of the suction piston.

On the end opposite the piston head 8 of the suction piston 5, a piston pull rod 15 runs through an opening 16 in the upper stop 17 of the suction tube 4. On the end of the piston pull rod 15, there is a pulling holding device 18 in the form of a grip.

FIG. 1 also shows that the suction tube 4 has a stop 17 on its second end that is opposite the coupling end and prevents the suction piston 5 from being completely pulled out of the suction tube 4. Repeated suction processes can accordingly follow each other more quickly. The stop 17 can be a sealing cover placed, e.g., glued, on the suction pipe end.

The suction pump 1 serves to produce a negative pressure in the cavity 25 in the negative pressure chamber of the negative-pressure retaining device according to FIG. 3 and FIG. 4 that is releasably fastened by a retaining body 24 to a substantially gas-tight contact surface 3. The retaining body 24 is square with rounded corners and plate-shaped. The contact surface 3 can for example be a ceramic wall in a kitchen or bathroom, or a windowpane.

The connection between the suction pump 1 and the retaining body 2 is created by releasably coupling the suction pump 1 to the retaining body 24 in that the seal 14 is pressed gas-tight onto the coupling surface 13.

The retaining body 2 has a downwardly open cavity 25, and a seal facing the contact surface 3 on the outer body edge. If the retaining body with the seal 29 is placed on the contact surface 3, then a closed negative pressure chamber is created from the open cavity 25 which is only accessible through the valve 26 that is enclosed by the suction pump 1 when it is coupled.

Without a suction process, the sealing ring 12 is located loosely between the first suction sealing washer 9 and the second suction sealing washer 10. The sealing ring 12 is designed as an O-ring whose inner free space has a greater diameter than the diameter of the piston between the suction sealing washers 9 and 10. Accordingly, the sealing ring 12 thus also has play. If the suction pump 1 with the suction tube 4 is placed gas-tight on the coupling surface 13, the suction process can then start. For this, the suction piston 5 is grasped by the grip 18 and pulled out up to the stop 17. In so doing, first the sealing ring 12 (supported by friction) is drawn against the first suction sealing washer 9 as shown in FIG. 5 and seals the annular gap. This is promoted by the rounded inner edge 27 of the suction sealing washer 9. When the suction piston 5 is pulled up further, the sealing ring 12 remains drawn against the first suction sealing washer 9 and is also pulled up. In the retaining body 24, the negative pressure opens the valve 26 to the cavity 25. The valve 26 is located on the coupling surface 13.

If someone wants to press down the suction piston 5 placed on the retaining body 24, an overpressure would form in the suction tube 4 in the piston interior 6.

To prevent this, the overpressure can escape through the recess 11 along the sealing ring 12. This has the advantage that additional pumping can occur without having to remove the suction pump 1. This state is shown in FIG. 6. The sealing ring 12 then lies against the second suction sealing washer 10 at a slight distance from the first suction sealing washer 9.

FIG. 7 again clearly shows one of the two recesses 11 in the second suction sealing washer 9. The O-ring in this case has not yet been pulled up between the first suction sealing washer 9 and second suction sealing washer 10. The rounded inner edge 27 of the first suction sealing washer 9 is also easily discernible here.

The invention claimed is:

1. A set comprising:
    a suction pump having a suction tube opening, and
    a negative-pressure retaining device with a valve that can be coupled to the suction tube opening of the suction pump in the region of the valve,
    wherein the negative-pressure retaining device comprises:
        a retaining body which forms a cavity as a negative pressure chamber, wherein a negative pressure can be produced in the negative pressure chamber after being applied to a contact surface,
        at least one seal which seals the negative pressure chamber gas-tight to an outside environment against the contact surface,
        at least one opening as an end of a connection of the negative pressure chamber to the outside environment with at least one valve that ensures gas-tight closing and opening of the connection of the negative pressure chamber to the outside environment, and
        means for establishing a releasable substantially gas-tight coupling of the suction tube opening of the suction pump to the negative-pressure retaining device in the region of the valve for producing the negative pressure; and
    wherein the suction pump comprises a suction tube with a piston interior having the suction tube opening and a suction piston that is guided in the suction tube along a suction tube wall, wherein at one end, the suction piston comprises a piston head with a piston seal, the piston seal sealingly lies against an inside of the suction tube wall, and the piston head with the piston seal can be moved away from the suction tube opening in the suction tube along a suction path, wherein the suction tube at an end of the suction path has one or more vent openings in the suction tube wall, and the piston seal can be moved past the vent openings so that ambient air flows into the piston interior of the suction tube with one puff; the piston head has a first and a second suction sealing washer, wherein at least one recess is introduced into the second suction sealing washer from an edge toward a center of the second suction sealing washer, the piston seal is arranged between the first and second suction sealing washers in the form of a sealing ring which sealingly lies against the first suction sealing washer when traveling out along the suction path, and lies against the second suction sealing washer when the piston head is traveling in so that any accumulated air along the sealing ring can escape by means of the recess.

2. The set according to claim 1, wherein the suction tube wall has two to four vent openings at the end of the suction path.

3. The set according to claim 1, wherein the suction tube has a stop at one end that strikes the piston head when the piston seal has passed the vent openings.

4. The set according to claim 3, comprising a piston pull rod that is guided through an opening of the stop, and connects the piston head and a grip.

5. The set according to claim 1, comprising the one or more vent openings at a beginning of the suction path which are closed to the outside environment with an elastic rubber sleeve.

6. A method for fastening a negative-pressure retaining device by means of a suction pump to a contact surface, wherein the negative-pressure retaining device and the suction pump are part of the set according to claim 1, the method comprising the following steps:
    placing the negative-pressure retaining device on the contact surface,
    establishing the releasable substantially gas-tight coupling of the opening of the negative-pressure retaining device having the valve to the suction pump, and
    producing a negative pressure in the piston interior of the suction pump by at least one suction pull, and hence also in the negative-pressure retaining device.

7. The set according to claim 1, wherein the at least one seal sealing the negative pressure chamber gas-tight against the contact surface is peripherally recessed in the retaining body.

* * * * *